(12) United States Patent
Jee et al.

(10) Patent No.: US 7,533,945 B2
(45) Date of Patent: May 19, 2009

(54) TREAD PATTERN FOR ENDLESS TRACK

(75) Inventors: Woo Y. Jee, Schaumburg, IL (US);
Dennis H. Jee, Schaumburg, IL (US)

(73) Assignee: SRJ, Inc., Addison, IL (US)

( * ) Notice: Subject to any disclaimer, the term of this patent is extended or adjusted under 35 U.S.C. 154(b) by 0 days.

(21) Appl. No.: 11/680,641

(22) Filed: Mar. 1, 2007

(65) Prior Publication Data
US 2008/0211301 A1 Sep. 4, 2008

(51) Int. Cl.
*B62D 55/26* (2006.01)
(52) U.S. Cl. .......................... 305/178; 305/171
(58) Field of Classification Search ................. 305/165, 305/167, 171, 172, 173, 174, 177, 178
See application file for complete search history.

(56) References Cited

U.S. PATENT DOCUMENTS

| 5,380,076 A | * | 1/1995 | Hori | 305/171 |
|---|---|---|---|---|
| 6,176,557 B1 | * | 1/2001 | Ono | 305/177 |
| 6,386,652 B1 | | 5/2002 | Bonko | |
| 6,406,106 B1 | | 6/2002 | Moss | |
| 6,474,756 B2 | * | 11/2002 | Hori et al. | 305/178 |
| 6,554,377 B2 | | 4/2003 | Yovichin et al. | |
| 2004/0004395 A1 | | 1/2004 | Soucy et al. | |

FOREIGN PATENT DOCUMENTS

| JP | 63-247178 | * | 10/1988 |
| JP | 4-271978 | * | 9/1991 |
| JP | 2005-186922 | * | 7/2005 |

* cited by examiner

*Primary Examiner*—Russell D Stormer
(74) *Attorney, Agent, or Firm*—Shumaker & Sieffert, P.A.

(57) ABSTRACT

A tread pattern for a vehicle track, such as an endless track for earth moving equipment, comprises a plurality of groups of tread lugs. Each group of tread lugs may comprise one or more tread lugs defining a generally "S" shape or a variation thereof. A vehicle track comprising the tread pattern may also comprise a support core that is substantially centered with a center of a group of tread lugs.

18 Claims, 5 Drawing Sheets

TREAD PATTERN FOR ENDLESS TRACK

TECHNICAL FIELD

The invention relates to a track for a vehicle, and more particularly, to a tread design for a vehicle track.

BACKGROUND

Many off-road vehicles, such as earthmoving vehicles (e.g., excavators, skid steer track loaders or multi-terrain track loaders) and agricultural vehicles, include an endless track coupled to a drive system, which may include, for example, one or more drive sprockets. An endless track may help provide traction on surfaces that traditional wheels having a circular cross-section may not be able to adequately grip. For example, a vehicle with an endless track may bridge a greater surface area than a vehicle with two or more circular wheels, which may help the vehicle with the endless track traverse surfaces that the vehicle with circular wheels would not ordinarily be able to traverse, such as uneven or loose surfaces (e.g., gravel or mud).

In some cases, an endless track is formed of metal, rubber, such as a molded rubber, or a combination of metal and rubber. The endless track may be molded as a single, integral piece or an assembly of interconnected parts that are coupled together to define an endless track. The endless track typically includes a body with a first, interior side that engages with a drive system and a second, exterior side that includes multiple protrusions (i.e., "traction lugs" or "tread lugs") extending from one or more common surfaces and defining a tread pattern. The exterior side is configured to engage with the ground, and the tread pattern is typically designed to optimize performance of the endless track. For example, the tread pattern may be designed to optimize performance of an endless track for a high speed skid steer track loader on a wet surface, on a loose surface or otherwise.

SUMMARY

In general, the invention is directed to a tread pattern for a vehicle track, such as an endless track. A tread pattern described herein comprises a plurality of groups one or more traction lugs, where each group defines a ground contact surface that has a shape that includes two branches extending from a center point in substantially opposite directions. In some embodiments, the shape resembles the letter "S" or a variation thereof (e.g., a mirror image of an "S" shape). In one embodiment, each group includes a single traction lug that defines a ground contact surface that the "S" shape or a variation of an "S" shape. In other embodiments, each group includes two or more traction lugs that are arranged to define a ground contact surface that has the "S" shape (or a variation thereof). For example, in one embodiment, each group of traction lugs comprises a center traction lug and two lateral traction lugs arranged on opposite sides of the center traction lug and laterally and longitudinally offset from each other to define an "S" shape or a variation thereof. The lateral traction lugs may be the same shape, where one lateral traction lug is oriented at about 180 degrees relative to the other lateral traction lug.

In one embodiment, the groups of traction lugs are longitudinally spaced around the track such that the "S" pattern substantially uniformly repeats around the circumference of an endless track. Adjacent groups of traction lugs may or may not circumferentially overlap with each other, and, in some embodiments, there is no lateral overlap between adjacent groups of traction lugs.

The tread pattern described herein may help maximize a total ground contact area of the vehicle track, while at the same time, minimize damage to relatively delicate contact surfaces, such as grass, in the case of tracks having a relatively low lug depth. In addition, a track comprising the tread pattern described herein may also comprise one or more support cores, such as a metal support core, that are positioned substantially under a center of each group of traction lugs in order to more evenly distribute a pulling (or other driving) force from a drive sprocket over the traction lug. A more even distribution of the force from the drive sprocket across the traction lugs may help the lugs wear more evenly, which may extend a life of the track. The track may also include a plurality of reinforcing members that each extend in a substantially longitudinal direction to further increase the strength of the track. In addition, the generally S shape of each group of traction lugs may help provide substantially equal traction power in both forward or reverse movement of the track.

In one embodiment, the invention is directed to a vehicle track comprising a first side configured to mount to a drive system of a vehicle and a second side opposite the first side and defining a tread pattern. The tread pattern comprises a central traction lug, a first lateral traction lug laterally and longitudinally offset from the central traction lug, and a second lateral traction lug laterally and longitudinally offset from both the central traction lug and the first lateral traction lug. The central lug connects the lateral traction lugs. In some examples, the central traction lug may be a first central traction lug, and the tread pattern may further comprise a second central traction lug longitudinally offset from the first central traction lug and substantially laterally aligned with the first central traction lug, a third lateral traction lug laterally and longitudinally offset from the second central traction lug, and substantially laterally aligned with the first lateral traction lug, and a fourth traction lug laterally and longitudinally offset from the second central traction lug, and substantially laterally aligned with the second lateral traction lug. In addition, in some examples, the first central traction lug, and the first and second lateral traction lugs may define a ground contact surface area that defines a generally S shape. In some examples, the generally S shape may he asymmetrical.

In another embodiment, the invention is directed to a system comprising a drive sprocket and an endless track coupled to the drive sprocket. The endless track defines an inner circumferential surface comprising a plurality of guide lugs defining a channel configured to receive the drive sprocket and an outer circumferential surface defining a tread pattern. The tread pattern comprises a central traction lug, a first lateral traction lug laterally and longitudinally offset from the central traction lug, and a second lateral traction lug laterally and longitudinally offset from both the central traction lug and the first lateral traction lug. The central lug connects the lateral traction lugs.

In another embodiment, the invention is directed to a track for a vehicle comprising a body defining an inner surface configured to mount to a drive system of the vehicle and an outer surface, a first group of traction lugs extending radially outward from the outer surface and comprising a first ground contact surface having a generally S shape, and a second group of traction lugs extending radially outward from the outer surface and comprising a second ground contact surface having the generally S shape. A first portion of the first traction lug at least partially shares a longitudinal position with a second portion of the second traction lug.

The details of one or more embodiments of the invention are set forth in the accompanying drawings and the descrip-

DETAILED DESCRIPTION

Figure 1:
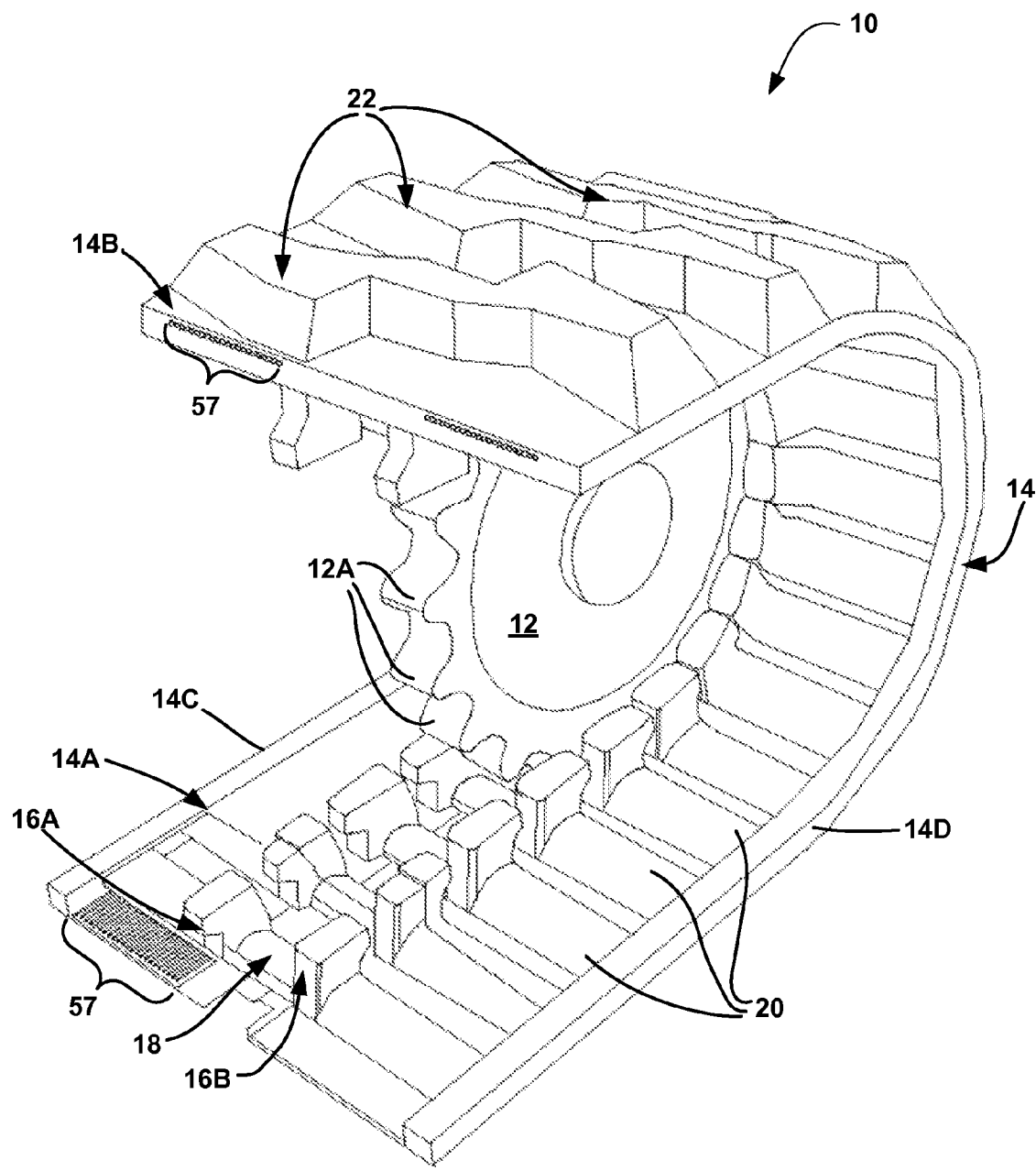
FIG. 1 is a schematic perspective view of a part of an endless track mounted about drive sprocket wheel comprising a plurality of teeth.

FIG. 1 is a schematic perspective view of a part of an endless track 10 mounted about drive sprocket wheel 12 comprising a plurality of teeth 12A. Drive sprocket wheel 12 may be, for example, a part of a drive system of a vehicle. The drive system may also include one or more other drive sprocket wheels, such as a drive sprocket wheel that is positioned on an opposite end of endless track 12 from drive sprocket wheel 12. Drive sprocket wheel 12, which is typically actuated by a drive motor, engages with endless track 10 and rotates endless track 10. As endless track 10 rotates and engages with a ground surface, a vehicle on which endless track 10 is mounted moves either forward or backward, depending on the direction in which endless track 10 rotates. In other embodiments, other drive mechanisms may be used to drive endless track 10. Endless track 10 may be used with an industrial vehicle, such as, but not limited to, an earthmoving vehicle (e.g., a skid steer loader) or an agricultural vehicle (e.g., a tractor).

In FIG. 1, a part of endless track 10 has been cut away to illustrate first side 14A and second side 14B of body 14. Second side 14B of body 14 is on an opposite side of body 14 from first side 14A. Disposed between first and second sides 14A, 14B of body 14 are reinforcing members 57, which are described in further detail below.

First side 14A defines an inner circumference of body 14 and is configured to mount endless track 10 to a drive system of a vehicle. In the particular embodiment shown in FIG. 1, first side 14A comprises two rows of guide lugs 16A and 16B (collectively "guide lugs 16") that help align and engage drive sprocket wheel 12 with endless track 10. In particular, guide lugs 16 define channel 18 that is sized and shaped to receive drive sprocket wheel 12. Guide lugs 16 of each row are longitudinally (or circumferentially in the case of an endless track) aligned with a corresponding guide lug 16 in the opposing row (i.e., one guide lug 16A is aligned with an opposing guide lug 16B). However, in other embodiments, guide lugs 16 may be arranged to partially longitudinally overlap with a corresponding guide lug 16 in the opposing row or to alternate with guide lugs 16 of the opposing row such that no two guide lugs 16 have the same longitudinal position along body 14.

First side 14A of body 14 also defines a plurality of ribs 20 that are configured to engage with teeth 12A of drive sprocket wheel 12 when endless track 10 is mounted on drive sprocket wheel 12. As drive sprocket wheel 12 rotates, teeth 12A engage with apertures defined between ribs 20 (i.e., apertures 54 shown in FIGS. 2A and 2B), which rotates endless track 10. As a result of the rotation of endless track 10, endless track 10 (and any vehicle on which endless track 10 is mounted) moves in a first direction (e.g., forward). If drive sprocket wheel 12 is rotated in an opposite direction, endless track 10 moves in a second direction opposite to the first direction (e.g., backward).

While drive sprocket wheel 12 is shown in the embodiment of FIG. 1, in other embodiments, other drive systems may be used to support and drive endless track 10. For example, rather than engaging with a center of first side 14A of body 14, the vehicle drive system may include sprockets that engage with shoulders 14C, 14D of body 14. In such an embodiment, first side 14A of body 14 may include guide lugs that are adjacent to shoulders 14C, 14D of body 14, rather than substantially centered, as shown in FIG. 1.

Second side 14B of body 14 defines an outer circumference of body 14 and is configured to engage with an exterior surface (i.e., the ground) when endless track 10 is mounted on a vehicle, and thus, second side 14B may be referred to as an "exterior" side of body 14. In order to help body 14 engage with the exterior surface, second side 14A comprises a tread pattern 22, which is defined by multiple traction lugs extending from a common surface.

When endless track 10 is used on a vehicle that is used for a range of applications, it may be desirable for tread pattern 22 to exhibit both good traction and provide a smooth ground engaging surface in order to help prevent damage to delicate work surfaces (e.g., grass). Different applications require different performance characteristics of endless track 10. For example, in landscaping applications, traction is not necessarily as big of a concern as for construction applications, but it may be desirable for tread pattern 22 to have a design that limits damage to grassy surface conditions. On the other hand, in construction applications, it may be desirable for tread pattern 22 to exhibit both relatively good traction and smooth operation on relatively uneven surfaces, but a relatively strong tread pattern 22 design that is design to endure high speed operations. Endless track 10 comprising tread pattern 22 in accordance with the invention addresses the concerns of both landscaping and construction applications of endless track 10, and may be designed to be useful with both landscaping and construction vehicles. Of course, endless track 10 may also be used with other applications, such as agricultural applications or other applications involving loose ground surfaces or other relatively tough terrain environmental conditions.

Figure 2A:
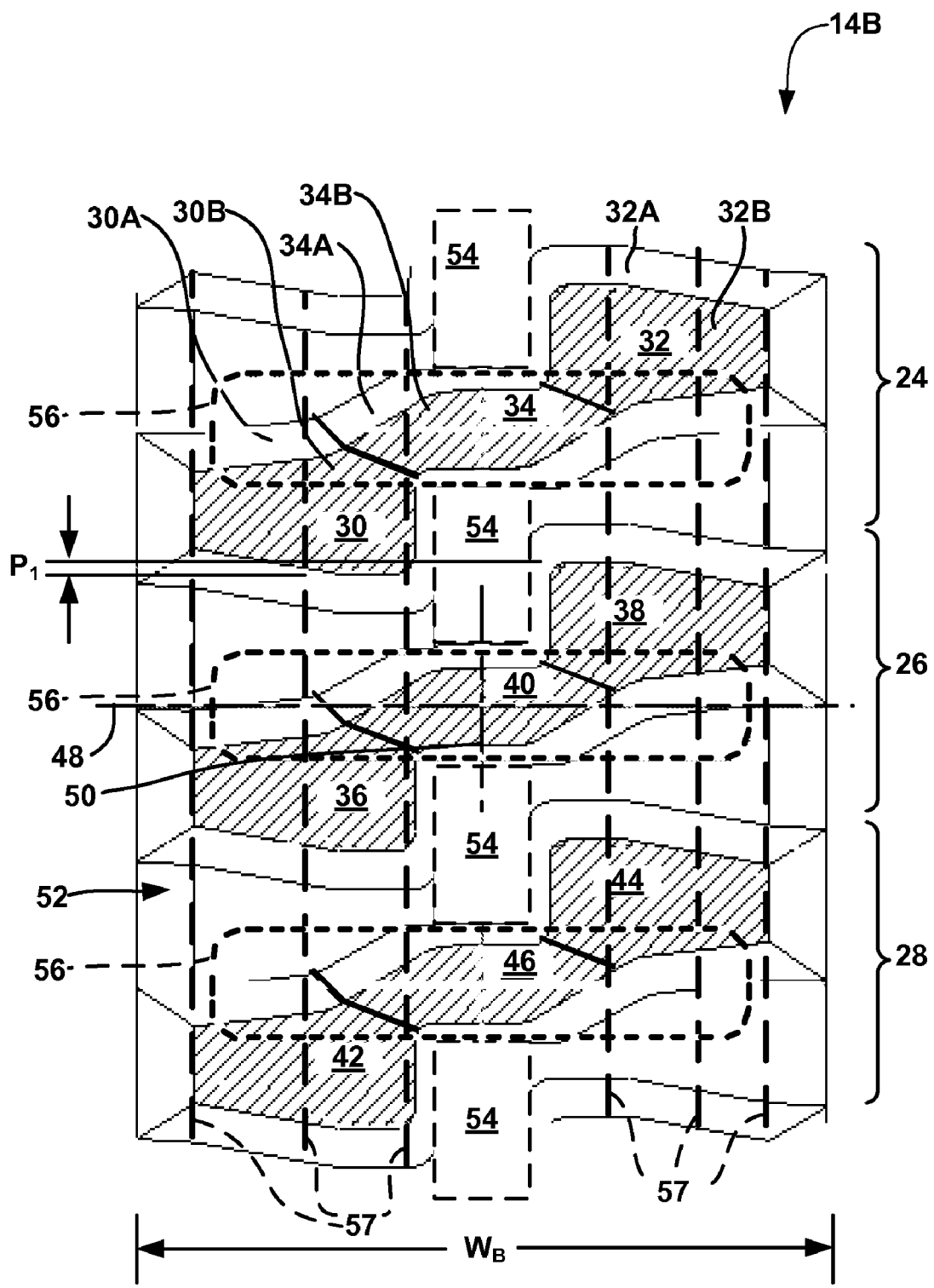
FIG. 2A is a schematic plan view of a part of the endless track shown in FIG. 1, and illustrates a tread pattern of the track.

Tread pattern 22 is shown in further detail in FIGS. 2A-4. FIG. 2A is a schematic plan view of second side 14B of body 14, and illustrates tread pattern 22. Tread pattern 22 is defined by a substantially uniformly repeating pattern of traction lugs. In the portion of tread pattern 22 shown in FIG. 2A, tread pattern 22 includes three groups of traction lugs 24, 26, and 28. However, second side 14B of body 14 includes more than the three groups of traction lugs 24, 26, and 28 shown in FIG. 2A, and typically includes as many as necessary to repeat along the outer circumference of body 14. Group 24 of traction lugs includes first lateral traction lug 30, second lateral traction lug 32, and center (or central) traction lug 34. Group 26 of traction lugs includes first lateral traction lug 36, second lateral traction lug 38, and center traction lug 40, connecting first and second lateral traction lugs 36 and 38. Group 28 of traction lugs includes first lateral traction lug 42, second lateral traction lug 44, and center traction lug 46, connecting first and second lateral traction lugs 42 and 44.

Group of traction lugs 24, 26, and 28 are substantially similar. Accordingly, only group 24 will be described in further detail, with the understanding that the description of group 24 of traction lugs is applicable to the description of groups 26 and 28. Each traction lug 30, 32, and 34 of group 24 defines a surface that defines the outermost surface of second surface 14B, and thus, the ground contact surface of group 24 of traction lugs. The outermost surface of each traction lug 30, 32, and 34 is shown with cross-hatch lines in FIG. 2A. To aid in the description of tread pattern 22, transverse axis 48 (i.e., an axis extending in a transverse or lateral direction) and circumferential axis 50 (i.e., an axis extending substantially along the outer circumference of body 14 or in a substantially longitudinal direction in the case of a vehicle track that does not comprise an outer circumference) are shown in FIG. 2A. Transverse axis 48 and circumferential axis 50 are generally perpendicular to each other.

Center traction lug 34 is substantially aligned with channel 18 defined by guide lugs 16 on first side 14A of body 14. Center traction lug 34 is laterally offset (i.e., offset along transverse axis 48) and longitudinally offset (i.e., offset along circumferential axis 50) from both first and second traction lugs 30 and 32. In addition, first and second traction lugs 30 and 32 are laterally and longitudinally offset from each other. First, second, and center traction lugs 30, 32, and 34 define an "S" shape, where first traction lug 30 is a first arm extending from center traction lug 34 and second traction lug 32 is a second arm extending in an opposite direction from center traction lug 34. The "S" shape may also be referred to as an "S wave" shape.

The "S" shape may generally be a curvilinear shape, where a first "arm" (i.e., first traction lug 30) of the track pattern extends from center traction lug 34 in a first lateral direction, while a second "arm" (i.e., second traction lug 32) of the track pattern on an opposite side of center traction lug 34 from the first arm and longitudinally offset therefrom extends in a second lateral direction substantially opposite that of the first lateral direction. The first and second arms may or may not be the same size or shape.

In the embodiment shown, first and second traction lugs 30 and 32, respectively, have substantially the same shape, but are oriented at about 180 degrees with respect to each other. In this way, the "S" shape has two arms that are mirror images of each other." In other embodiments, the "S" shape does not need to have two "arms" that are substantially similar in shape or size. For example, in other embodiments, first and second traction lugs 30 and 32 are not necessarily the same size, while in other embodiments, first and second traction lugs 30 and 32 extend from center traction lug 34 at different angles or distances (i.e., a furthermost distance from center traction lug 34 to an end of first traction lug 30 adjacent to shoulder 14C may not be equal to a distance from the same point on center traction lug 34 to an end of second traction lug 32 adjacent to shoulder 14D).

It is believed that track pattern 22 including the first and second arms extending in substantially opposite directions from a substantially central point of track 10 may help provide generally even traction in both forward and reverse motion of track 10. This substantially even traction may help achieve substantially even wear of tread lugs 30, 32, and 34, which may help extend the life of track.

Center traction lug 34 connects first and second traction lugs 30, 32 such that traction lugs 30, 32, and 34 are substantially continuous and define a single ground contact surface (shown as cross-hatched lines) for engaging with an exterior surface. The arrangement of traction lugs 30, 32, and 34 provides an asymmetrical and bidirectional tread pattern 22, which provide substantially equal traction in both forward and backward movement of endless track 10. In other embodiments, center traction lug 34 may connect first and second traction lugs 30, 32, but traction lugs 30, 32, and 34 may not define a single surface. Instead, lugs 30, 32, 34 may define three surfaces that are separated from each other by a channel.

Each traction lug 30, 32, and 34 protrudes from common surface 52. For example, lug 30 protrudes from common surface 52 to define walls 30A that extend from common surface 52 to ground contact surface 30B. Traction lugs 32 and 34 similarly define walls 32A, 34A, respectively, that extend between common surface 52 and ground contact surface 32B, 34B, respectively. Ground contact surfaces 30B, 32B, and 34B define a radially outmost surface of body 14 and in the embodiment shown in FIG. 2A, ground contact surfaces 30B, 32B, and 34B have substantially the same elevation (measured in a direction substantially perpendicular to the plane of the image of FIG. 2A) relative to common surface 52. In other embodiments, lugs 30, 32, and 34 may protrude from one or more surfaces that have different elevations. In those cases, ground contact surface 30B, 32B, and 34B of each traction lug 30, 32, and 34, respectively, may or may not have the same elevation, but may still be substantially continuous.

Also shown in FIG. 2A are teeth engaging apertures 54 (shown in phantom lines), which are sized and shaped to receive teeth 12A of drive sprocket wheel 12. Apertures are defined by guide lugs 16 and ribs 20 within channel 18 on first side 14A of body 14. Apertures 54 are disposed between each group 24, 26, and 28 of traction lugs. In the embodiments shown in FIG. 2, apertures 54 and a center traction lug (e.g., traction lugs 34 and 46) of each group of traction lugs alternate, such that apertures 54 do not longitudinally overlap with any traction lugs. In other embodiments, apertures 54 may overlap with center traction lugs of each group of traction lugs in the longitudinal direction (i.e., along circumferential axis 50) and/or the lateral direction (i.e., along transverse axis 48).

In order to increase the strength of endless track 10, support cores 56 (shown in phantom lines) may be coupled to body 14. Support cores 56 may also be referred to as "links" of endless track 10. Support cores 56 may be embedded in body 14 or attached to one or both sides 14A, 14B of body 14. For example, in embodiments in which body 14 comprises multiple layers of material, support cores 56 may be positioned between layers of material. Alternatively, in embodiments in which body 14 is molded, support cores 56 may be introduced into the molding material prior to curing the material to form body 14. As yet another alternative, support cores 56 may be adhered to body 14 using any suitable adhesive.

Support cores 56 may be made of any suitable material and in any suitable configuration. In the embodiment shown in FIG. 2A, support cores 56 are comprised steel, iron or another metal. In some embodiments, support cores 56 are composed of two sections, where a first section engages with the drive sprocket teeth 12A in order to help move track 10, and a second part is the remainder of the body. The two sections may or may not be integrated into a single support core. For example, in embodiments in which support core 56 is a single, integral component, support cores 56 may be manufactured by hot forging, using metal rods or, alternatively, support cores 56 may be cast from metal. While support cores 56 having a rectangular shape with rounded corners (from the plan view shown in FIG. 2A) are shown in FIG. 2A, in other embodiments, support cores 56 may be any suitable configuration.

In the embodiment shown in FIG. 2A, one support core 56 corresponds to each group 24, 26, and 28 of traction lugs. In particular, center traction lug 34, 40, 46 of each group 24, 26, and 28 of traction lugs, respectively, is centered over one support core 56. In other embodiments, multiple support cores 56 may correspond to each group 24, 26, and 28 or one support core 56 may span two or more groups 24, 26, and 28 of traction lugs.

Center traction lugs 34, 40, 46 typically provide the primary engagement surface between endless track 10 and the ground because of the central position of center traction lugs 34, 40, and 46 on body 14 and alignment with drive sprocket wheel 12 (via apertures 54). By placing each center traction lug 34, 40, 46 at least partially over a support core 56, support core 56 helps at least the center portion of tread pattern 22 to remain relatively stiff. Of course, while some degree of flexibility along transverse axis 48 is desirable for tread pattern 22 in order to allow tread pattern 22 to accommodate varying ground conditions, it may also be desirable for body 14 to exhibit some integrity to provide stability to endless track 10. Thus, support core 56 provides integrity to endless track 10, but is positioned within body 14 such that center traction lugs 34, 40, 46 still exhibit some degree of flexibility to enable endless track 10 to conform to different ground surfaces. In the embodiment shown in FIG. 2A, support core 56 is also aligned with a part of first and second traction lugs 30, 32, which helps to increase the integrity of at least those portions of traction lugs 30, 32.

A high impact force is exerted on second side 14B of body 14 and traction lugs 30, 32, and 34 when teeth 12A of drive sprocket wheel 12 engage with apertures 54 and drive sprocket wheel 12 contacts portions of body 14 comprising support cores 56. This is especially true if group 24 of traction lugs are located between drive sprocket wheel 12 (and the vehicle) and the ground because group 24 of traction lugs must support the weight of the vehicle. In the track pattern 22 design shown in FIG. 2A, the impact force from drive sprocket wheel 12 and the weight of the vehicle is distributed over ground contact surfaces 30B, 32B, and 34B of traction lugs 30, 32, and 34, respectively, and over at least one support core 56. It is believed that the distribution of force is at least partially attributable to the interconnection of traction lugs 30, 32, and 34 to define a substantially continuous ground contact surface, and the alignment of center traction lug 32 with support core 56. Spreading the impact force laterally over the traction lugs of each group of traction lugs in tread pattern 22 and support cores 56 may help reduce the occurrence of cracking in any areas of tread pattern 22 that experience an unbalanced impact force. An unbalanced impact force may be attributable to an uneven mounting of endless track 10 on a vehicle and any uneven wear of tread pattern 22, among other things.

In order to further increase the strength of endless track 10, the endless track include may include multiple reinforcing members 57 coupled to body 14. Reinforcing members 57 extend in a substantially longitudinal direction along circumferential axis 50. As with support cores 56, reinforcing members 57 may be embedded in body 14, such as by placing reinforcing members 57 between layers in body 14 or embedding reinforcing member 57 in body 14 during a molding process. While six reinforcing members 57 symmetrically arranged about circumferential axis 50 are shown in FIG. 2A, endless track 10 may include any suitable number of reinforcing members 57 in any suitable arrangement. For example, in some embodiments, body 14 may include about 30 to about 80 reinforcing members 57. The number of reinforcing members 57 may be selected based on the width $W_B$ of body 14 and the desired application of endless track 10.

Reinforcing members 57 may be a flexible steel cord (or cable) having a minimum tensile strength of about 400 kilograms. The ends of each reinforcing member 57 may be coupled together in some embodiments. For example, the ends of each reinforcing member 57 may be adjacent to each other, which may be referred to as a jointless connection, or the ends may overlap in the longitudinal, lateral, and/or radial direction (which is substantially perpendicular to the circumferential and traverse axes 50, 48, respectively), which may be referred to as a jointed connection.

Body 14 of endless track 10 may be defined by a single molded piece of material or may be an assembly of interconnected parts that are coupled or bonded together to define an endless track. In some embodiments, body 14 of endless track 10 is composed at least in part of a natural rubber, synthetic rubber, or combinations thereof or other elastomeric materials. Examples of suitable synthetic rubbers include styrene butadiene rubber and polybutadiene rubber. Of course, body 14 may also include other agents and activators to help achieve desired material properties, such as reinforcing agents, vulcanization accelerators, antiozonants, antioxidants, vulcanizing agents, retarders, rubber softeners, tackifiers, and so forth. The exact composition of body 14 may depend upon various factors, including the particular application endless track 10 is intended to be used with and the range of applications.

An elastomeric body 14 may help provide better maneuverability of a vehicle, better ride quality, and increased traction as compared to steel endless tracks. In one embodiment, the rubber comprising first surface 14A (including guide lugs 16 and ribs 20) of about 63 durometer to about 83 durometer, while the rubber comprising second surface 14B (including groups 24, 26, and 28 of traction lugs) has a hardness in a range of about 53 durometer to about 73 durometer. In one particular embodiment, a rubber having a hardness of about 73 durometer may be used to form first surface 14A, while a rubber having a hardness of about 63 durometer may be used to form second surface 14B. It may be desirable for groups 24, 26, and 28 of traction lugs to be softer than first side 14A of body 14 because performance of endless track 10 may be optimized when traction lugs 30-44 are able to conform to a range of ground conditions and when guide lugs 16 and ribs 20 on first side 14A are relatively rigid to provide sufficient engagement with drive sprocket wheel 12.

Body 14 may have any suitable width $W_B$, which may depend upon the particular application of endless track 10 and vehicle with which endless track 10 is used. In one embodiment in which endless track 10 is used with a skid steer loader, body 14 has a width $W_B$ (measured in a direction along transverse axis 48) of about 150 millimeters (mm) to about 500 mm. In one embodiment, width $W_B$ is about 180 mm. In other embodiments, width $W_B$ is about 200 mm, 230 mm, 300 mm, 320 mm, 400 mm, and 450 mm.

As previously discussed, an arrangement of a group of traction lugs is repeated on second side 14B of body 14 in a longitudinal direction to define a tread pattern 22. Each group of traction lugs are separated from each other by a pitch. One example pitch distance separating adjacent groups of traction lugs is described using first and second groups 24 and 26. An edge of traction lug 30 of first group 24 longitudinally overlaps with closest edge of traction lug 38 of second group 26 in a longitudinal direction by pitch $P_1$. Groups of traction lugs that are arranged such that at least one traction lug of one group longitudinally, but not laterally, overlaps with one traction lug of an adjacent group may help increase the smoothness with which endless track 10 traverses a surface. In one embodiment, pitch $P_1$ is about 50 mm to about 100 mm. For example, pitch may be about 72 mm. However, in accordance with the invention, each group 24, 26, and 28 of traction lugs may be separated from an adjacent group by any suitable pitch $P_1$. The example pitch $P_1$ values provided herein, as well as the other dimensions provided herein, or for descriptive purposes and the present invention is no way limited to the dimensions provided herein.

Figure 2B:
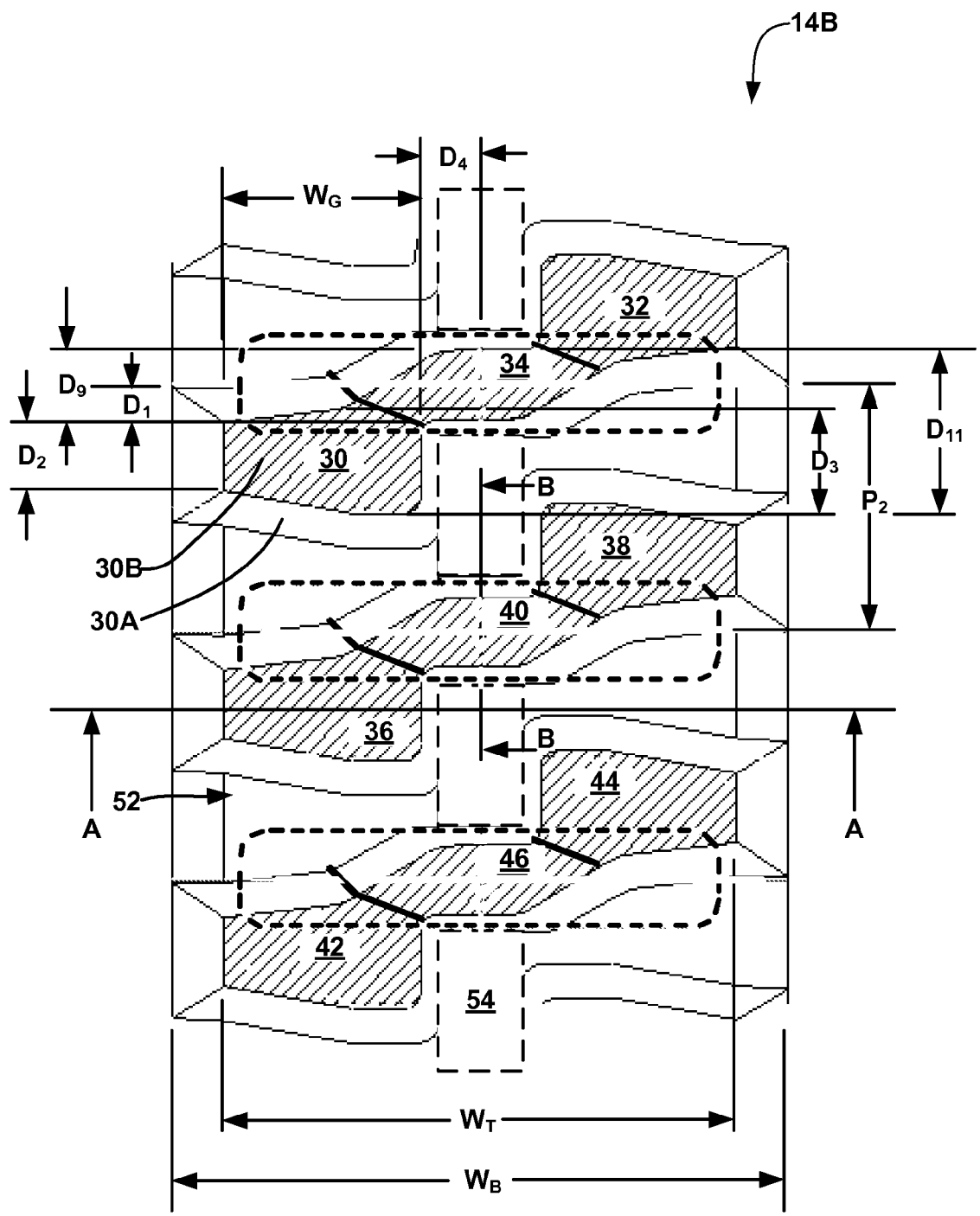
FIG. 2B is a schematic plan view of the track of FIG. 2A, further illustrating various dimensions of features of the tread pattern.

Other example dimensions in accordance with one embodiment of the invention are shown in FIG. 2B, which is the same schematic plan view of second side 14B of body 14 shown in FIG. 2A. Reinforcing members 57 have been removed from FIG. 2B for clarity of illustration. Again, the dimensions described with respect to traction lugs 30, 32, and 34 of the first group 24 of traction lugs is also applicable to traction lugs 36, 38, and 40, respectively, of second group 26 and traction lugs 42, 44, and 46, respectively, of third group 28.

Width $W_T$ of the ground engaging surfaces 30B, 32B, and 34B of first group 24 of traction lugs is about 75 percent (%) to about 100% of width $W_B$ of body 14. In the embodiment shown in FIG. 2B, a total width $W_T$ of the ground engaging surfaces 30B, 32B, and 34B of first group 24 is about 83% of width $W_B$ of body 14. Each group of traction lugs in tread pattern 22 helps distribute the impact force from drive sprocket wheel 12 (as well as any other drive wheels of a vehicle drive system) substantially over the width $W_B$ of body 14 because the total width $W_T$ of each group of traction lugs occupies a majority of the width $W_B$ of body 14. The distribution of impact forces over a relatively large percentage (75% or greater) of the width $W_B$ of body 14 may contribute to a relatively smooth vehicle operation and a tread pattern 22 that provides relatively good traction while minimizing damage to fragile ground surfaces, such as grass.

Ground engaging surfaces 30B and 32B of first and second traction lugs 30 and 32, respectively, each have an overall width $W_G$ of about 20% to about 40% of width $W_T$ of ground engaging surfaces 30B, 32B, and 34B. For example, width $W_G$ may be about 38% of width $W_T$.

A center of each support core 56 is separated from a center of an adjacent support core by pitch $P_2$. Pitch $P_2$ may depend on the type of application endless track 10 is used for as well as the width $W_B$ of body 14.

As previously described, first traction lug 30 defines wall 30A and exterior engaging surface 30B. In the plan view shown in FIG. 2B, distance $D_1$ of wall 30A from common surface 52 to exterior engaging surface 30B is about 6 mm to about 16 mm. In one embodiment, distance $D_1$ is about 11 mm. Exterior engaging surface 30A has a variable length (measured substantially perpendicular to width $W_B$ of body 14) from about $D_2$ to about $D_3$. In one embodiment, $D_2$ is about 10 mm to about 30 mm, while $D_3$ is about 20.5 mm to about 40.5 mm. For example, in one particular embodiment, $D_2$ is about 20 mm, while $D_3$ is about 30.5 mm. $D_2$ may depend on pitch $P_2$ between each support core 56. In one embodiment, distance $D_2$ is about 5% to about 35% of pitch $P_2$. For example, distance $D_2$ may be about 28% of pitch $P_2$.

A lateral and longitudinal center of center traction lug 34 is separated from a closest edge of ground contact surface 30B of first traction lug 30 by distance $D_4$. Distance $D_4$ ultimately depends upon the width $W_G$ of the ground contact surfaces 30B and 32B of adjacent traction lugs 30 and 32, respectively, because center traction lug 34 bridges traction lugs 30 and 32. In particular, distance $D_4$ may be determined after selected a desired width $W_T$ of the overall ground contact surface of first group 24 of traction lugs and subtracting the width $W_G$ of each of the ground contact surfaces 30B and 32B of adjacent traction lugs 30 and 32. The overall width $W_G$ of the ground contact surface of first group 24 of traction lugs (as well as the other groups of traction lugs of tread pattern 22) may be selected prior to selecting the individual dimensions of each traction lug 30, 32, and 34 because the desired performance of endless track 10 may be generally achieved based on overall width $W_G$ of the ground contact surface of first group 24. In one embodiment, distance $D_4$ is about 7 mm to about 17 mm. For example, in one particular embodiment, distance $D_4$ is about 12 mm. Second traction lug 32 has substantially similar dimensions as first traction lug 30, but in the embodiment shown in FIGS. 2A-2B, second traction lug 32 has the same shape as first traction lug 30, but rotated about 180 degrees.

Center traction lug 34 has a maximum length (measured along circumferential axis 50) of about $D_9$. In one embodiment, $D_9$ is substantially equal to $D_2$, which is a smallest length of first traction lug 30. Distance $D_{11}$ is measured from an edge of ground contact surface 30B of first traction lug 30 to a furthest edge of ground contact surface 34B of center traction lug 34. In one embodiment, distance $D_{11}$ is about 20% to about 80% of pitch $P_2$ between each support core 56. For example, distance $D_{11}$ may be about 66% of pitch $P_2$.

Figure 3:
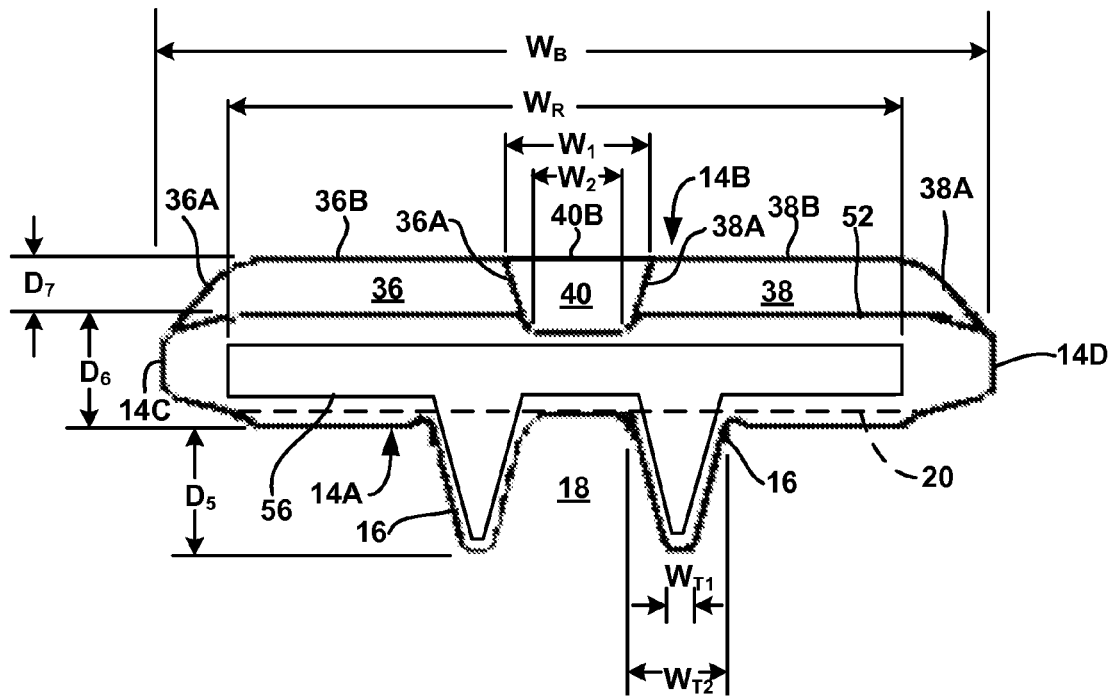
FIG. 3 is a schematic cross-sectional end view of the body of the endless track taken along line A-A in FIG. 2B.

FIG. 3 is a schematic cross-sectional view of body 14 of endless track 10 taken along line A-A in FIG. 2B and illustrates cross-sectional view of second group 26 of traction lugs. Hence, the view of FIG. 3 looks down a longitudinal length of endless track 10. Cross-sectional views of first and third groups 24, 28 of traction lugs are substantially similar to the cross-sectional view of second group 26. Traction lugs 36, 38, and 40 of second group 26 of traction lugs extend from common surface 52 of second side 14B of body 14. Guide lugs 16 extend from first side 14A of body 14 to define channel 18, which in combination with ribs 20 defines a plurality of apertures 54 (shown in FIGS. 2A-2B) that are configured to receive teeth 12A of drive sprocket wheel 12 (shown in FIG. 1). Support core 56 is embedded in body 14 and includes projections that extend into guide lugs 16, thereby increasing the rigidity of guide lugs 16. In the embodiment shown in FIG. 3, support core 56 extends across a large percentage of width $W_B$ of body 14. In one particular embodiment, support core 56 has a width $W_R$ of about 160 mm, while body 14 has a width $W_B$ (measured from sidewall 14C to side wall 14D of body 14) of about 180 mm.

In some applications of endless track 10, it may be desirable for traction lugs 36, 38, and 40 (as well as the other traction lugs of tread pattern 22) to be substantially devoid of support core 56 in order to provide some degree of flexibility when endless track 10 is mounted on drive sprocket wheel 12. The flexibility of the traction lugs 36, 38, and 40 enables endless track 10 to conform to uneven surfaces.

Other example dimensions of one embodiment of body 14 are shown in FIG. 3. Again, the dimensions provided herein are merely for one embodiment of the invention. Guide lugs 16 each have a tip width $W_{T1}$ of about 3 mm to about 10 mm and a base width $W_{T2}$ of about 15 mm to about 25 mm. In one embodiment, tip width $W_{T1}$ is about 6 mm and base width $W_{T2}$ is about 21 mm. Traction lugs 16 each extend from first surface 14A a distance $D_5$, which may be about 15 mm to about 35 mm. In one embodiment, distance $D_5$ is about 26.5 mm.

First surface 14A of body 14 is distance $D_6$ from common surface 52 of second surface 14B. In one embodiment, distance $D_6$ is about 15 mm to about 25 mm. For example, in one particular embodiment, distance $D_6$ is about 24 mm. Traction lugs 36, 38, and 40 extend distance $D_7$ from common surface 52 of second surface 14B. That is, traction lugs 36, 38, and 40 have an elevation $D_7$ from common surface 52 of second surface 14B. In one embodiment, distance $D_7$ is about 5 mm to about 30 mm. For example, in one particular embodiment, distance $D_7$ is about 18 mm.

Ground contact surfaces 36B and 38B of first and second traction lateral lugs 36 and 38, respectively, of second group 26 are separated by width $W_1$. In one embodiment, width $W_1$ is about 25 mm to about 45 mm. For example, in one particular embodiment, width $W_1$ is about 35 mm. Wall 36A of first traction lug 36 of second group 26 is separated from a closest wall 38A of second traction lug 38 of second group 26 by width $W_2$. In one embodiment, width $W_2$ is about 12 mm to about 32 mm. For example, in one particular embodiment, width $W_2$ is about 12 mm.

Figure 4:
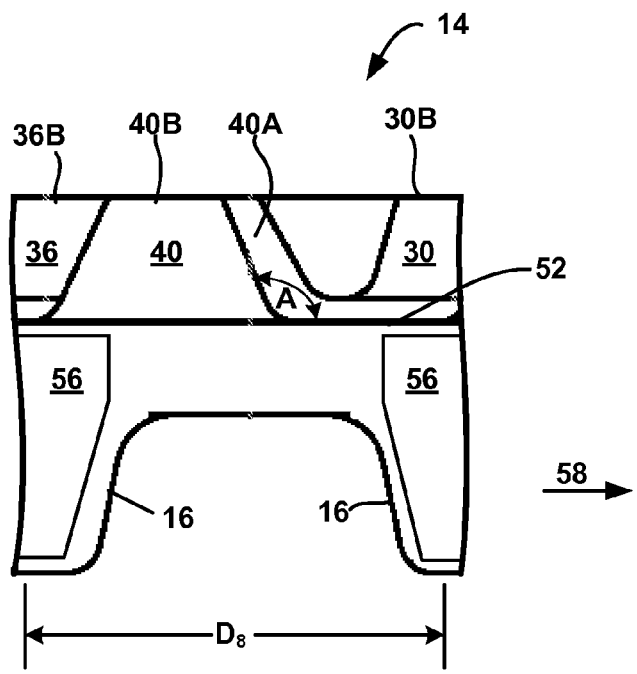
FIG. 4 is a schematic cross-sectional side view of the body of the endless track taken along line B-B in FIG. 2B.

FIG. 4 is a schematic cross-sectional side view of a part of body 14 of endless track 10 taken along line B-B in FIG. 2B. Line B-B is substantially perpendicular to line A-A in FIG. 2B. When viewing the cross-sectional view taken within center traction lug 40 of second group 26, a part of first traction lug 36 and a part of first traction lug 30 of an adjacent group 24 of traction lugs are shown due to the circumferentially overlapping nature of adjacent groups 24, 26 of traction lugs. Wall 40A of center traction lug 40 is oriented at an obtuse angle A relative to common surface 52 and extends between common surface 52 and ground contact surface 40B of center traction lug 40.

As FIG. 4 illustrates, support cores 56 each extend substantially into a respective guide lug 16. Guide lugs 16 are separated from adjacent guide lugs 16 in a longitudinal direction (indicated by arrow 58) by a distance $D_8$, which is measured from a center of one guide lug 56 to a center of an adjacent guide lug 56. In one embodiment, distance $D_8$ is about 62 mm to about 82 mm. For example, in one particular embodiment, distance $D_8$ is about 72 mm. Distance $D_8$ may be adjusted depending on the distance separating each group 24, 26, and 28 of traction lugs and the size of drive sprocket wheel 12. For example, distance $D_8$ between guide lugs 16 may be selected to accommodate the size of drive sprocket wheel 12 because distance $D_8$ between guide lugs 16 affects the distance separating apertures 54 (FIG. 2A), which are configured to engage with teeth 12A of drive sprocket wheel 12.

Figure 5:
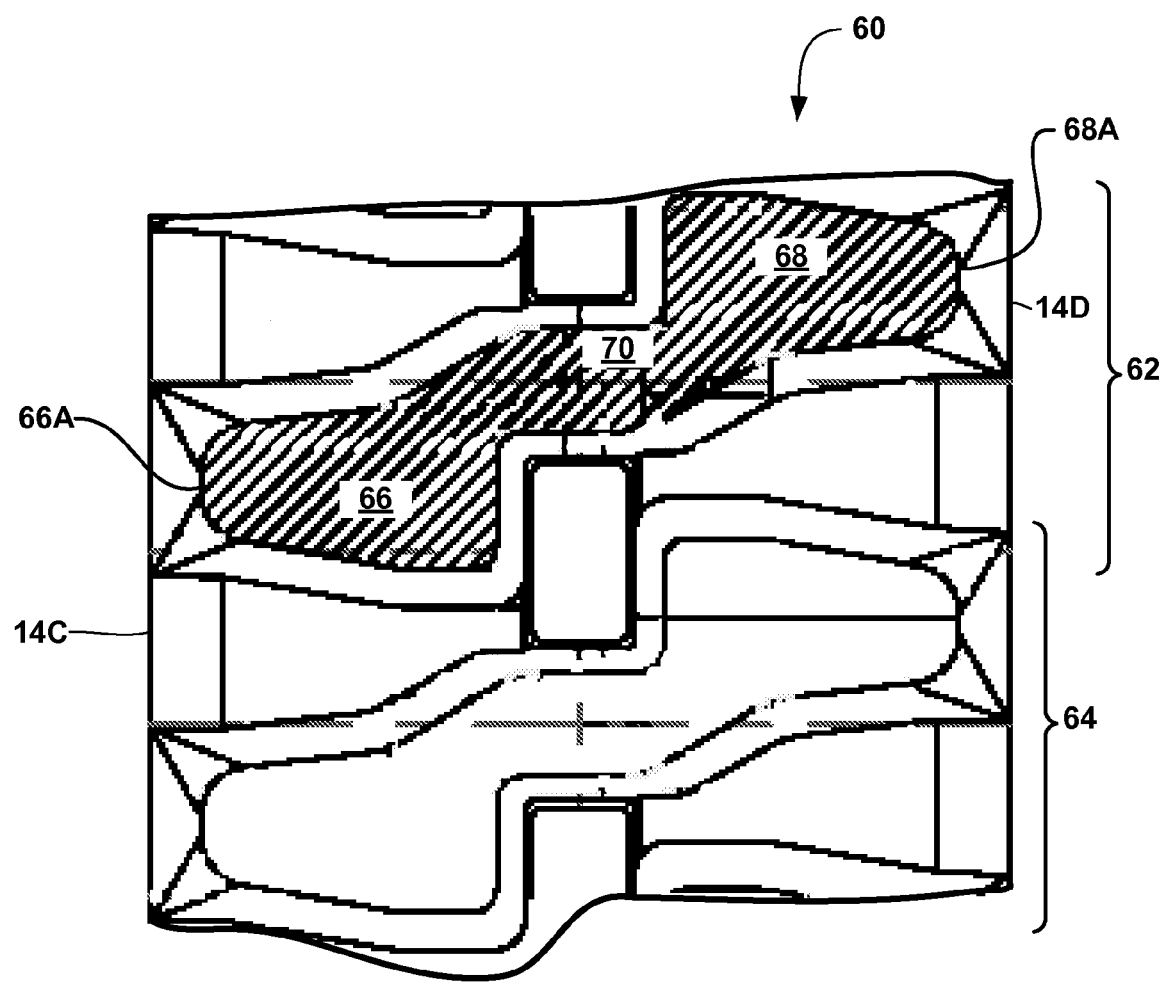
FIG. 5 is a schematic plan view of another embodiment of an endless track and illustrates another embodiment of a tread pattern.

A vehicle track in accordance with the invention may also comprise other tread patterns defined by a substantially repeating pattern of one or more traction lugs comprising two arms that are longitudinally offset from each other and laterally extend in substantially opposite directions from a center point of the track, where the pattern is repeated in a longitudinal direction. The traction lugs may define an "S" shape or a variation thereof in some embodiments. FIG. 5 illustrates a plan view of another embodiment of a tread pattern 60, which includes first and second group 62, 64, respectively, of traction lugs. Tread pattern 60 is similar to tread pattern 22, except that traction lugs 66 and 68 adjacent to sidewalls 14C and 14D of body 14 comprise curved edges 66A and 68B, respectively, rather than substantially straight edges, such as with traction lugs 30 and 32 of FIG. 2A.

Various embodiments of the invention have been described. These and other embodiments are within the scope of the following claims.

The invention claimed is:

1. A vehicle track comprising:
   a first side configured to mount to a drive system of a vehicle;
   a second side opposite the first side and defining a tread pattern comprising:
   a first group of traction lugs comprising:
   a first central traction lug;
   a first lateral traction lug laterally and longitudinally offset from the first central traction lug;
   a second lateral traction lug laterally and longitudinally offset from both the first central traction lug and the first lateral traction lug, wherein the first central lug connects the lateral traction lugs; and
   a second group of traction tugs comprising:
   a second central traction lug longitudinally offset from the first central traction lug and substantially laterally aligned with the first central traction lug;
   a third lateral traction lug laterally and longitudinally offset from the second central traction lug, and substantially laterally aligned with the first lateral traction lug; and
   a fourth traction lug laterally and longitudinally offset from the second central traction lug, and substantially laterally aligned with the second lateral traction lug, wherein the first lateral traction lug and the fourth lateral traction lug at least partially overlap in a longitudinal direction; and
   a plurality of support cores, wherein the first and second group of traction lugs each correspond to only one support core of the plurality of support cores.

2. The track of claim 1, wherein the central traction lug is substantially centered for engagement with a drive wheel of the drive system.

3. The track of claim 1, wherein the third lateral traction lug is substantially laterally aligned with the first lateral traction lug, and
   the fourth traction lug is substantially laterally aligned with the second lateral traction lug.

4. The track of claim 1, wherein the first side comprises a plurality of guide lugs defining a channel configured to engage with one or more drive sprockets of the drive system, wherein the first central traction lug is substantially centered with the channel.

5. The track of claim 1, wherein the first central traction lug and first and second lateral traction lugs define a substantially continuous ground contact surface.

6. The track of claim 1, wherein the track comprises a plurality of body sections coupled together, each body section comprising at least one tread pattern.

7. The track of claim 1, wherein the tread pattern is repeated substantially uniformly over the second side.

8. The track of claim 1, wherein the plurality of support cores are located between the first and second sides of the track.

9. The track of claim 8, wherein the plurality of support cores comprises a first support core corresponding to the first group of traction lugs, and at least a portion of the first support core is substantially centered with the first central traction lug.

10. The track of claim 1, further comprising a plurality of reinforcing members extending substantially longitudinally across the track.

11. The track of claim 10, wherein the reinforcing members are embedded in the track.

12. The track of claim 1, wherein the first central traction lug defines a first surface and a first wall extending between the first surface and a common surface of the second side of the track, the first lateral traction lug defines a second surface and a second wall extending between the second surface and the common surface of the second side, and the second lateral traction lug defines a third surface and a third wall extending between the third surface and the common surface of the second side.

13. The track of claim 12, wherein the first, second, and third walls are each oriented at an obtuse angle with respect to the common surface of the second side of the track.

14. The track of claim 12, wherein the first, second, and third surfaces protrude different distances from the common surface of the second side of the track.

15. The track of claim 1, wherein the first and second lateral traction lugs have substantially similar shapes, the second lateral traction lug being oriented at about 180 degrees relative to the first lateral traction lug.

16. The track of claim 1, wherein the first central traction lug, and the first and second lateral traction lugs define a ground contact surface area that defines a generally S shape.

17. A system comprising:
a drive sprocket; and
an endless track coupled to the drive sprocket and defining:
  an inner circumferential surface comprising a plurality of guide lugs defining a channel configured to receive the drive sprocket; and
  an outer circumferential surface defining a tread pattern comprising:
    a first group of traction lugs comprising:
      a first central traction lug;
      a first lateral traction lug laterally and longitudinally offset from the first central traction lug;
      a second lateral traction lug laterally and longitudinally offset from both the first central traction lug and the first lateral traction lug, wherein the first central lug connects the lateral traction lugs; and
    a second group of traction lugs comprising:
      a second central traction lug longitudinally offset from the first central traction lug and substantially laterally aligned with the first central traction lug;
      a third lateral traction lug laterally and longitudinally offset from the second central traction lug, and substantially laterally aligned with the first lateral traction lug; and
      a fourth traction lug laterally and longitudinally offset from the second central traction lug, and substantially laterally aligned with the second lateral traction lug, wherein the first lateral traction lug and the fourth lateral traction lug at least partially overlap in a longitudinal direction; and
    a plurality of support cores, wherein the first and second group of traction lugs each correspond to only one support core of the plurality of support cores.

18. The system of claim 17, wherein the plurality of support cores comprises a first support core corresponding to the first group of traction lugs, and at least a portion of the first support core is substantially centered with the first central traction lug.

* * * * *